March 12, 1974 J. GUIGAN 3,796,638
DEVICE FOR INOCULATION OF A CULTURE MEDIUM
Filed Dec. 1, 1970 2 Sheets-Sheet 1

INVENTOR
JEAN GUIGAN

March 12, 1974  J. GUIGAN  3,796,638
DEVICE FOR INOCULATION OF A CULTURE MEDIUM
Filed Dec. 1, 1970  2 Sheets-Sheet 2

INVENTOR
JEAN GUIGAN

United States Patent Office 3,796,638
Patented Mar. 12, 1974

3,796,638
DEVICE FOR INOCULATION OF A CULTURE MEDIUM
Jean Guigan, 9 Rue Jean-Mermoz, Paris 8e, France
Filed Dec. 1, 1970, Ser. No. 94,042
Int. Cl. C12k 1/00
U.S. Cl. 195—127                                              7 Claims

ABSTRACT OF THE DISCLOSURE

A method and test tube for inoculation of a nutrient medium layer on a Petri dish or the like. A liquid bacteria containing sample is centrifuged in the test tube, which contains at its bottom a small ferromagnetic ball. After centrifugation first the liquid supernatant is discharged while the ball is retained in the interior of the tube, and then the ball is placed on the nutrient medium. For inoculation along a desired track it is moved over the nutrient medium layer by respective movements of a magnet positioned under the dish.

---

This invention is concerned with a method and a device for the inoculation of a culture medium forming the active surface of a Petri dish or the like.

It is known that the first operational step to identify bacteria contained in a sample comprises the isolation and propagation of the bacteria. In case the sample is liquid it is placed in a receptacle and submitted to strong centrifuging. The solid phase containing the bacteria is thus separated from the liquid phase and forms a sediment at the bottom of the receptacle. The liquid phase is then removed and with a sterile scoop or brush an amount of the solid phase containing the bacteria is taken to inoculate a culture medium or a Petri dish.

The inoculation performed in this manner is a sequence of lengthy manual operations. Moreover it is likely to be dangerous for the operator in case the bacteria are generating infectious diseases. It is an object of the present invention to provide a method for rapid inoculation which is safe for the operator and by which the manual operations are simplified and automatized.

Another object of the invention is to provide a simple, inexpensive and disposable device for performing the said method.

According to the invention this is achieved by a method of the type initially described comprising the following successive steps:

The sample is placed in a tube containing a ferromagnetic metal element: the tube is centrifuged; the liquid contained in the tube after centrifugation is discharged while the element is retained in the interior of the tube; the element is placed on the active surface of a horizontally positioned Petri dish or the like; the element is moved over the active surface by respective movements of a magnet positioned under the Petri dish.

Preferably, the method according to the invention is performed with a tube closed at one end and adapted for centrifuging a liquid biological sample comprising means for retaining a metallic element in its interior while the tube is turned upside-down. According to a preferred embodiment the said means includes a projection positioned in the interior and near the bottom of the tube which is adapted to retain the element when the tube is inclined against the horizontal in a way that its opening and its generating line through the center of the projection are directed downwardly and, which releases the element when the tube is turned by 180° about its axis.

Other advantageous details of the invention will become apparent from the following description of a preferred embodiment of the invention taken in conjunction with the accompanying drawing in which FIGS. 1a, 1b show elevational views of the tube according to the invention before and after centrifugation.

FIGS. 3a, 3b show the traces of the element on a Petri dish or the like, and

Figure 1A:
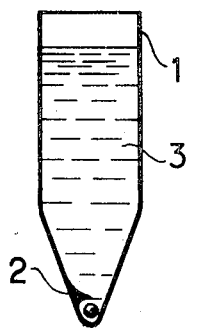
Figure 1B:
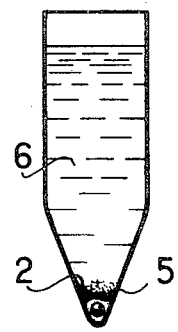
Figure 2A:
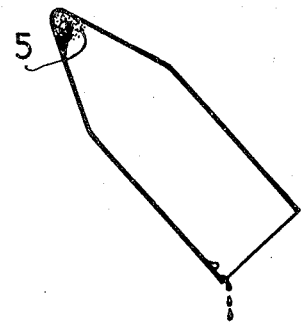
FIGS. 2a, 2b, 2c show the tube of FIG. 1 while performing the different steps of the method according to the invention.
Figure 2C:
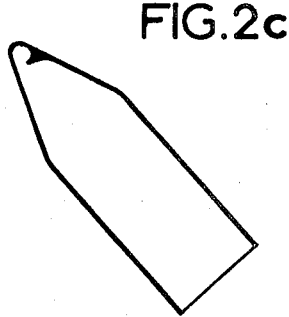
Figure 2B:
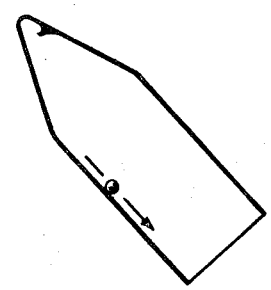
Figure 2B:
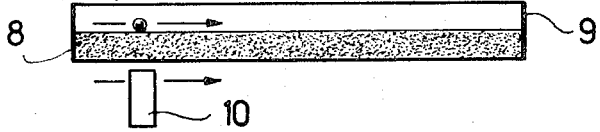

With reference to FIG. 1 of the accompanying drawing the tube has a substantially conical bottom section. In its interior in the area of the conical section the tube 1 is provided with a projection 2. At the bottom of tube 1 is disposed a ball consisting of a ferromagnetic metal. A sample to be tested is filled into the tube and centrifuged. After the centrifuging the solid bacteria containing components 5 of the sample settle to the bottom of the tube while being covered by a liquid phase 6. The tube is then placed in the position shown in FIG. 2a in which the liquid is discharged, whereas the ball is retained by the projection 2. After the liquid is removed the tube is turned by 180° about its axis whereby the ball is released as shown in FIG. 2a. The ball is placed onto a layer of gelatine 8 on a horizontally positioned Petri dish 9 as shown in FIG. 2c.

Figure 3A:
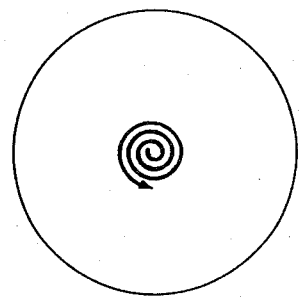
Figure 3B:
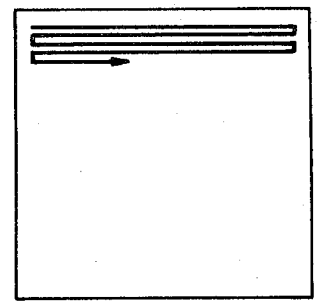

By moving a magnet 10 positioned under the Petri dish the ball can be guided along any desired trace on the gelatine surface. Thus the ball charged with bacteria deposits the latter while rolling over the active surface and effects an inoculation by regular "abrasion." In case the Petri dish is circular the trace can be a spiral from the center to the periphery as shown in FIG. 3a. For a square or oblong dish an inoculation trace in regular windings as shown in FIG. 3b would be appropriate. The tube as described is adapted to be manufactured as a single piece. Its production costs are so low that it can together with the ball be disposed of after a single use thus avoiding any cleaning and sterilizing. Accordingly the inoculation procedure is rapid and practically automatic.

According to a modification the projection is replaced by a resilient portion of the tube permitting the ball to be retained by way of clamping while the liquid is discharged after the centrifugation.

According to another variant embodiment the tube contains neither a projection nor a resilient portion but the ball is retained by a magnet disposed outside the tube or fastened to the tube, e.g. moulded into the tube wall. In case the magnet is separated from the tube it can be removed to release the ball, whereas in case the magnet is fixedly connected to the tube a stroke given to the tube will release the ball to place it on the surface of the Petri dish.

After an incubation the bacteria to be identified are observed through a binocular microscope and isolated into generally liquid culture mediums. A container holding the culture medium may have the form shown in FIGS. 4a, 4b.

A body 17 is composed by two chambers 18, 19 which are closed by a single plug 20. The plug 20 thus consists of two sections 22, 23 one of which, 22, is provided with a brush 21.

Figure 4A:
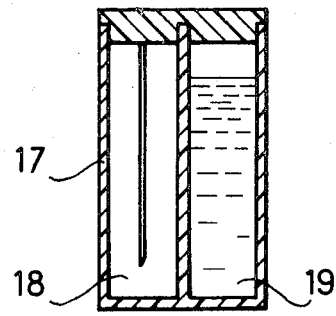
FIGS. 4a, 4b, 4c show a container for withdrawing and cultivating the bacteria occurring on the active surface.
Figure 4B:
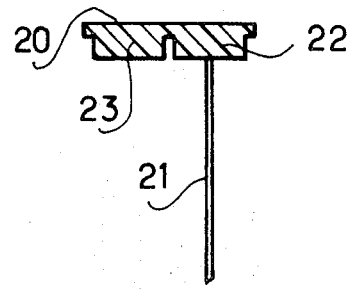

Prior to its use the section 22 of plug 20 covers chamber 18, the brush 21 being inside chamber 18 as shown in FIG. 4a. Section 23 of plug 20 covers the chamber 19 which contains a liquid culture medium. The entire arrangement is furnished sterile.

Figure 4C:
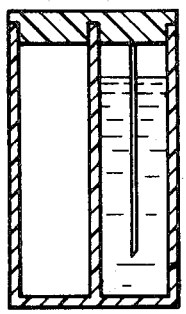

The plug 20 is then detached and with the brush 21 a colony of bacteria which had been observed with the microscope is withdrawn and transferred to the culture medium by placing the brush 21 into chamber 19 as shown in FIG. 4c. Thus the culture medium is inoculated.

Other modifications may of course be made to the specific embodiments of the invention without departing from the spirit of the invention which is set out in the following claims.

Having now particularly described and ascertained the nature of our said invention and in what manner the same is to be performed, we declare that what we claim is:

1. In an open ended test tube carrying a liquid bacteria containing sample for bacteria inoculation of a nutrient medium layer on a Petri dish or the like and wherein said test tube is subjected to centrifuging to separate the liquid supernatant from the bacteria carrying solid phase, the improvement comprising:
   a freely movable magnetic material ball positioned in said tube, means for retaining said ball at the bottom of said tube when said tube is positioned upright during centrifuging so that said bacteria carrying solid phase envelopes said ball and for selectively retaining said ball in said tube during initial inverting of said tube to expel the liquid contents therefrom by gravity prior to subsequent discharge of said bacteria coated ball from the open end of the inverted tube onto said nutrient medium layer.

2. A tube according to claim 1 wherein said retaining means comprises a projection positioned in the interior of and near the bottom of the tube and overlying said ball during centrifuging, and wherein said projection extends circumferentially only about portion of the tube interior to retain the ball when the tube is inclined against the horizontal in one way with its opening and its generating line through the center of the projection directed downwardly, but which releases the ball when the tube is turned by 180° about its axis when in such inverted position.

3. The tube according to claim 2 wherein the bottom portion of the tube receiving said ball is substantially conical.

4. A tube according to claim 1 wherein the means for retaining the ball comprises a resilient portion of the tube enabling the ball to be clamped thereby.

5. A tube according to claim 1 wherein the means for retaining the ball comprises a magnet positioned outside the tube.

6. A tube according to claim 1 wherein the means for retaining the ball comprises a magnet fixedly connected to the tube.

7. A tube according to claim 6 wherein the magnet is moulded into the tube wall.

References Cited

UNITED STATES PATENTS

| | | | |
|---|---|---|---|
| 2,848,006 | 8/1958 | Simpson | 215—1 R |
| 3,106,845 | 10/1963 | Dimmick | 195—103.5 R |
| 263,053 | 8/1882 | McCollin | 233—26 |
| 3,163,160 | 12/1964 | Cohen | 195—139 |
| 3,660,243 | 5/1972 | Young | 195—127 |

FOREIGN PATENTS

| | | | |
|---|---|---|---|
| 251,552 | 5/1926 | Great Britain | 215—Dig. 5 |

ALVIN E. TANENHOLTZ, Primary Examiner

M. D. HENSLEY, Assistant Examiner

U.S. Cl. X.R.

215—1 R, Dig. 5; 233—26; 221—228; 195—120

UNITED STATES PATENT OFFICE
CERTIFICATE OF CORRECTION

Patent No. 3,796,638          Dated     March 12, 1974

Inventor(s)     Jean Guigan

It is certified that error appears in the above-identified patent and that said Letters Patent are hereby corrected as shown below:

In The Heading:

The Claim to Priority Was Omitted. Should be

--December 9, 1969      France......................69.42557--

Signed and sealed this 9th day of July 1974.

(SEAL)
Attest:

McCOY M. GIBSON, JR.          C. MARSHALL DANN
Attesting Officer              Commissioner of Patents